METHOD OF MAKING A MAGNETIC RECORDING AND STORAGE DEVICE

Filed June 9, 1971 3 Sheets-Sheet 1

INVENTORS.
Sami A. Halaby
Neal S. Kenny
James A. Murphy
BY
James C. Kesterson
ATTORNEY

METHOD OF MAKING A MAGNETIC RECORDING AND STORAGE DEVICE

Filed June 9, 1971 3 Sheets-Sheet 2

*INVENTORS.*
*Sami A. Halaby*
*Neal S. Kenny*
*James A. Murphy*
BY
James C. Kesterson
ATTORNEY INVENTORS.
Sami A. Halaby
Neal S. Kenny
James A. Murphy
BY
James C. Kesterson
ATTORNEY United States Patent Office 3,795,542 Patented Mar. 5, 1974

3,795,542

METHOD OF MAKING A MAGNETIC RECORDING AND STORAGE DEVICE

Sami A. Halaby, Raleigh, N.C., and Neal S. Kenny, Horseheads, and James A. Murphy, Painted Post, N.Y., assignors to Corning Glass Works, Corning, N.Y.

Filed June 9, 1971, Ser. No. 151,356
Int. Cl. C22c 39/00
U.S. Cl. 117—237 17 Claims

ABSTRACT OF THE DISCLOSURE

A method of making a magnetic recording and storage device comprising the step of forming an alpha ferric oxide film or an iron film on a surface of an inorganic and non-magnetic substrate or support member. The substrate and film combination are then subjected to a controlled atmosphere at an elevated temperature, which converts the film to magnetite suitable for use in magnetic recording and storage devices. The magnetite film may then be further converted to a film of gamma ferric oxide, also suitable for use in magnetic recording and storage devices, by subjecting the substrate and magnetite film to an oxidizing atmosphere at a second predetermined elevated temperature.

CROSS REFERENCE TO RELATED APPLICATION

This application contains subject matter in common with co-pending application Ser. No. 151,388 by Sami A. Halaby, Neal S. Kenny and James A. Murphy filed June 9, 1971 and titled "Method of Making a Magnetic Recording and Storage Device."

BACKGROUND OF THE INVENTION

(I) Field of the invention

This invention relates to a novel method of fabricating magnetic recording and storage devices such as tapes, drums, disks, rods, and wires. Such storage devices may be used for storing digital information used in data processing computers, or any other analog or digital information where magnetic storage is desired.

(II) Description of the prior art

Heretofore, binding materials such as epoxies, urethanes, vinyls or the like have been used for binding particles of a magnetic material to each other and to substrates or support members of a non-magnetic material for the purpose of making or manufacturing magnetic recording and storage devices. The use of such binding materials and the necessary polishing of the combination magnetic material and binding material subsequent to the application thereof to the substrate as heretofore required is time consuming and therefore adds to the cost of manufacturing such recording and storage devices.

SUMMARY OF THE INVENTION

Briefly, according to this invention an inorganic and non-magnetic substrate or support member is provided, on the surface of which a film of alpha ferric oxide, or elemental iron is formed. The film formed on said substrate is then converted to magnetite by heating said support member and film combination to a temperature of at least 300° C. in an oxidation-reduction atmosphere. For most applications, magnetite is an excellent material for a magnetic recording and storage device, however, for some applications, gamma ferric oxide may be preferable. Therefore, if gamma ferric oxide is preferred, the magnetite film can be readily converted to a gamma ferric oxide film by subjecting said magnetite film to an oxidizing atmosphere within a prescribed temperature range.

It is therefore an object of this invention to provide a simple and economical method of producing magnetic recording and storage devices.

Additional objects, features, and advantages of the present invention will become apparent to those skilled in the art from the following detailed description and attached drawings.

BRIEF DESCRIPTION OF THE INVENTION

DETAILED DESCRIPTION OF THE INVENTION

Figure 1:
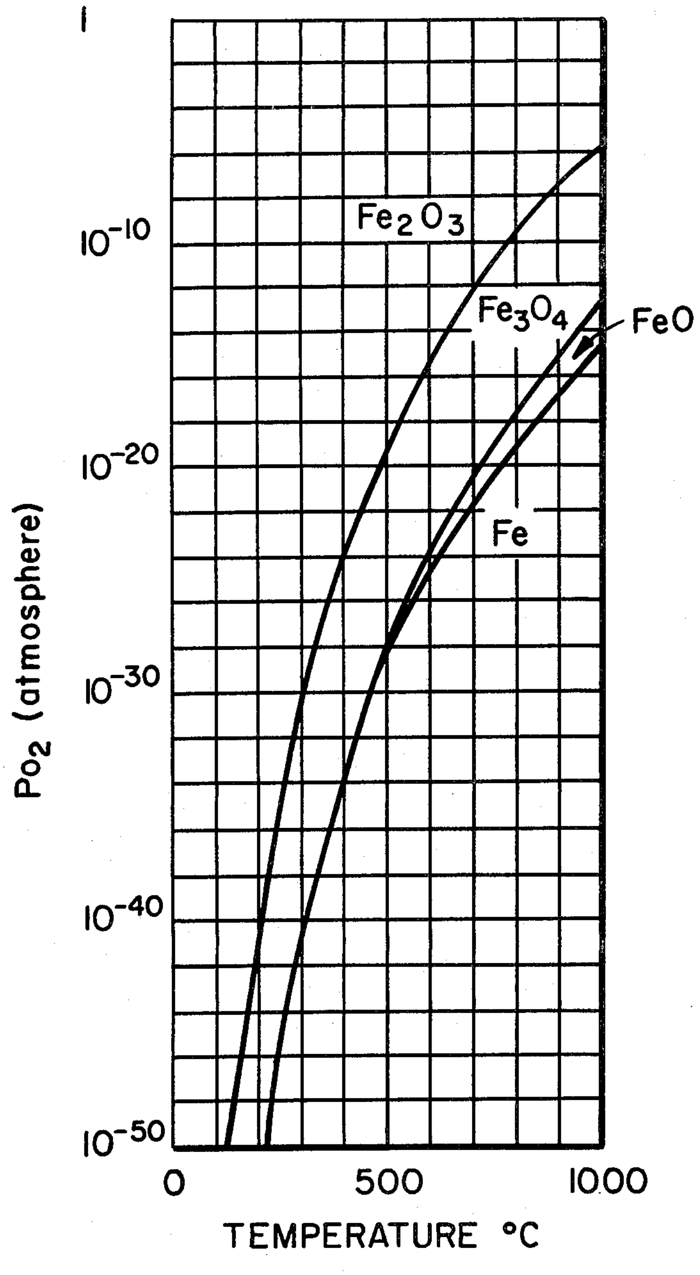
FIG. 1 is a phase diagram of the iron-oxygen system for temperature vs. oxygen pressure.

A substrate or support member in the form of a disk, tape, rod, drum or wire is provided from any suitable inorganic and non-magnetic material such as but not limited to aluminum, glass, glass-ceramic or ceramic that can withstand without damage the high temperatures encountered in the method of this invention. An especially suitable substrate for the practice of this invention is ion exchange strengthened glass or glass-ceramic. There are several suitable ion exchange processes well known in the art. A basic discussion of such processes may be found in a publication entitled "Stresses in Glass Produced by Non-Uniform Exchange of Monovalent Ions" by S. S. Kistler, published by the Journal of the American Ceramic Society, February 1962, pp. 59–68.

According to a first embodiment, a thin film of iron (Fe) is deposited on a surface of said substrate by methods including but not limited to vacuum vapor deposition, vacuum evaporation, and R.F. and D.C. sputtering. Each of these deposition processes are familiar and well known to one skilled in the art. The iron film may be deposited to any desired thickness depending upon the future use of the magnetic storage device. However, if a magnetite ($Fe_3O_4$) or gamma-ferric oxide ($\gamma$-$Fe_2O_3$) film suitable for most present recording and storage application is to be produced, the iron film should be between approximately 500 A. and 4000 A. in thickness. The iron film is then converted into alpha ferric oxide ($\alpha$-$Fe_2O_3$) by heating and maintaining the substrate and iron film combination at a temperature of between 300° C. minimum up to a maximum temperature determined by physical limitations of the substrate while said substrate and iron film are subjected to an oxidizing atmosphere such as air. The time required to convert a film of iron into alpha ferric oxide varies with the thickness of the iron film and the temperature to which the film is subjected. It has been found, however, that 10 hours at 300° C. is sufficient time to convert a 4000 A. thick film of iron to alpha ferric oxide in an air atmosphere, and that a period of about 15 minutes at 450° C. is sufficient time to satisfactorily convert a 500 A. thick film of iron to alpha ferric oxide in an air atmosphere. Therefore, the time to convert any iron film between about 500 A. and 4000 A. in thickness at any temperature between about 300° C. and 450° C. should be between about 15 minutes and 10 hours. The volume of the alpha ferric oxide film is about two times that of the deposited iron film, and a 1900 A. thick iron film will result in approximately a 3900 A.–4000 A. alpha ferric oxide film. The substrate and alpha ferric oxide film combination may be cooled and stored as necessary, or the alpha ferric oxide film may immediately be converted to magnetite.

The following method is equally effective for converting a film of alpha ferric oxide or elemental iron to magnetite. The method of converting these films comprises heating and maintaining the film and substrate combination at a temperature of between 300° C. minimum up to a maximum temperature determined by structural limitations of the substrate while said combination is contained in an oxidation-reduction atmosphere. The term oxidation-reduction atmosphere when used herein means an atmosphere having a controlled oxygen pressure, which, when used in conjunction with elevated temperatures will result in either alpha ferric oxide being converted to magnetite or elemental iron being converted to magnetite. Magnetite is a semi-oxidized state of iron. The important consideration of the oxidation-reduction atmosphere is the oxygen pressure of the atmosphere.

FIG. 1 is a phase diagram that shows whether iron, Fe, or one of the iron-oxygen system phases, FeO, $Fe_2O_3$ or $Fe_3O_4$ will be stable at a particular temperature and oxygen pressure ($PO_2$). For example, if the magnetite phase is to be stable, the oxygen pressure must be between about $5\times10^{-41}$ atmosphere and $5\times10^{-31}$ atmosphere for a temperature of around 300° C., and between about $10^{-18}$ atmosphere and about $10^{-10}$ atmosphere for a temperature of around 800° C. Because of the very low oxygen pressure necessary at temperatures less than about 800° C. an atmosphere consisting essentially of free oxygen is, for practical reasons, inconvenient, if not impossible, to use. Therefore, to obtain an atmosphere having the necessary oxygen pressure at temperatures less than around 800° C., it is desirable to use an atmosphere having essentially no free oxygen, and consisting of at least one oxygen containing compound. Atmospheres particularly suitable for use with this ivention include but are not limited to a hydrogen and water ($H_2/H_2O$) mixture, a carbon monoxide and carbon dioxide ($CO/CO_2$) mixture, and a carbon monoxide and water ($CO/H_2O$) mixture. An inert gas, such as nitrogen, may be combined with these oxidation-reduction atmospheres without significantly reducing the effectiveness thereof. An atmosphere of $H_2$ and $H_2O$ in combination with $N_2$ especially suitable for use with the method of this invention may be obtained by bubbling a mixture of hydrogen and nitrogen through water. The important consideration of this particular atmosphere is the hydrogen partial pressure to water partial pressure ratio ($PH_2:PH_2O$). The nitrogen is inert and acts only as a carrier gas for the water so that the ratio of hydrogen to water in the system is more easily controlled. The allowable range of hydrogen partial pressure to water partial pressure ratio which will produce the necessary oxygen pressure for converting an alpha ferric oxide film or elemental iron film to magnetite will vary as the temperature of the film and substrate combination varies.

Figure 2:
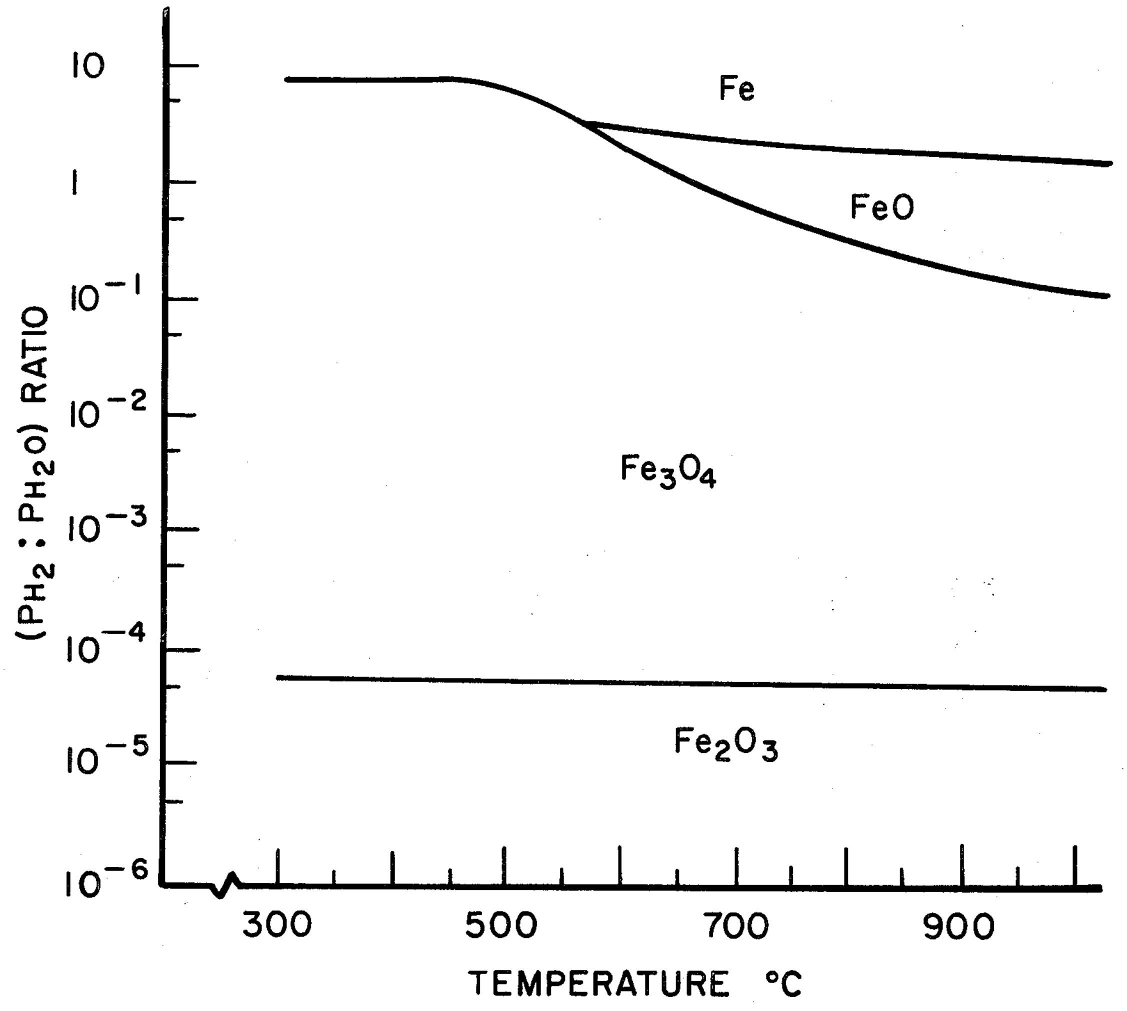
FIG. 2 is a phase diagram of the iron-oxygen system for temperature vs. $PH_2:PH_2O$ (hydrogen partial pressure to water partial pressure ratio).

FIG. 2 is a phase diagram that shows whether iron, Fe, or one of the iron-oxygen system phases, FeO, $Fe_2O_3$ or $Fe_3O_4$, will be stable at a particular hydrogen partial pressure to water partial pressure ratio and temperature. For example, the allowable range of hydrogen pressure to water partial pressure ratio for a temperature of approximately 300° C. necessary to stabilize the iron-oxygen system in the magnetite phase is between approximately 8:1 and approximately $5\times10^{-5}$:1. That is, a hydrogen and water mixture having this range of hydrogen to water partial pressure ratios will have an oxygen pressure of between about $5\times10^{-41}$ and $5\times10^{-31}$ atmosphere. If a temperature of approximately 525° C. is used, a partial pressure ratio range between approximately 5:1 and $5\times10^{-5}$:1 is necessary, however, for ease of control, a range of between 3:1 and $10^{-2}$:1 is preferable. More specifically, a particularly effective oxidation-reduction atmosphere with a 2.4:1 ratio of hydrogen partial pressure to water partial pressure can be obtained by bubbling a mixture of 8% by volume of hydrogen and 92% by volume of nitrogen through water, while said hydrogen, nitrogen and water is maintained at approximately 25° C.

Figure 3:
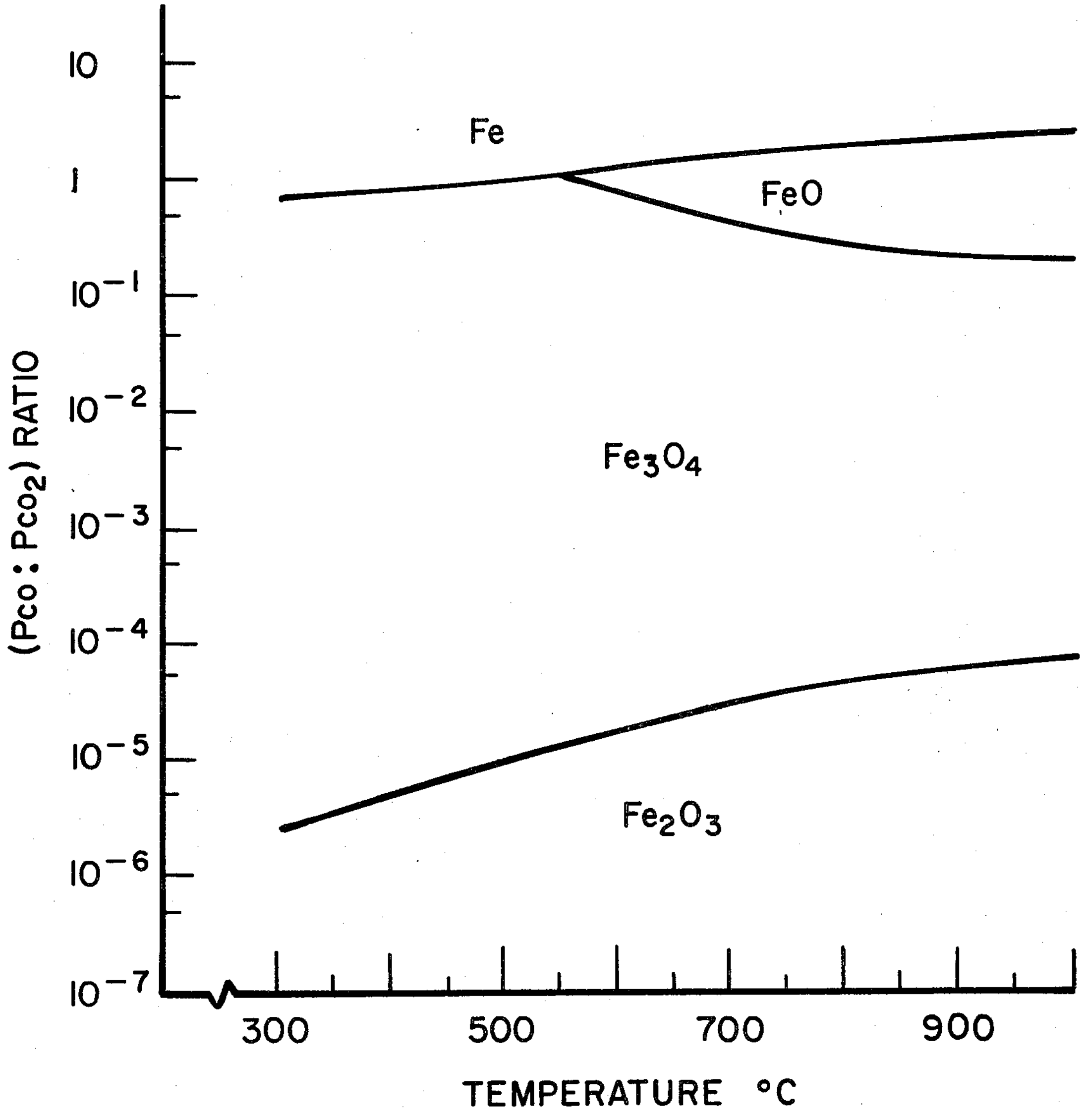
FIG. 3 is a phase diagram of the iron-oxygen system for temperature vs. $PCO:PCO_2$ (carbon monoxide partial pressure to carbon dioxide partial pressure ratio).

Another effective oxidation-reduction atmosphere for use with this invention is a mixture of carbon monoxide (CO) and carbon dioxide ($CO_2$). Since both constituents of this mixture are gases the correct proportions can easily be controlled within a suitable range by the use of simple instrumentation such as a flowmeter. The important consideration of this atmosphere is the carbon monoxide partial pressure to carbon dioxide partial pressure ratio ($PCO:PCO_2$). FIG. 3 is a phase diagram that shows whether iron, Fe, or one of the iron oxygen system phases, FeO, $Fe_2O_3$ or $Fe_3O_4$ will be stable at a particular carbon monoxide partial pressure to carbon dioxide partial pressure ratio and temperature. For example, the allowable range of carbon monoxide partial pressure to carbon dioxide partial pressure ratios for a temperature of approximately 300° C. necessary to stabilize the iron-oxygen system in the magnetite phase is between approximately $8\times10^{-1}$:1 and $3\times10^{-6}$:1. That is, a carbon monoxide and carbon dioxide mixture having this range of carbon monoxide to carbon dioxide partial pressure ratios will have an oxygen pressure between about $5\times10^{-41}$ and $5\times10^{-31}$ atmosphere. If a temperature of approximately 525° C. is used a partial pressure ratio of between 1:1 and $10^{-5}$:1 is necessary, however, for ease of control, a range of between 1:1 and $10^{-2}$:1 is preferable.

It is to be noted, that the iron-oxygen phase diagrams of both FIG. 2 and FIG. 3, are discontinued at the low temperature of approximately 300° C., that FIG. 1 is discontinued at pressures less than $10^{-50}$ atmosphere, and that FIGS. 1, 2 and 3 are discontinued at a high temperature of approximately 1000° C. The diagrams are discontinued at the low temperatures since the conversion from an unstable phase to a stable phase is so slow at temperatures below about 300° C., with the exception of the conversion from magnetite to gamma ferric oxide, that all of the phases may be considered stable for a short period of time. The conversion of magnetite to gamma ferric oxide, as will be further discussed hereinafter, is rapid down to about 200° C. The diagrams are discontinued at about 1000° C. since, as will be further explained hereinafter, it is unlikely that for the purposes of this invention higher temperatures would be desired.

Although, as was discussed heretofore, temperatures much higher than 600° C. may be used in conjunction with an oxidation-reduction atmosphere to convert an iron film or alpha ferric oxide film to magnetite, the use of temperatures higher than 600° C. may result in a slight decrease in the coercivity of the magnetite as well as other minor deleterious effects to the magnetic qualities of the magnetite film. The film and substrate are maintained in said oxidation-reduction atmosphere for a period of time between 5 minutes and 1½ hours. Five minutes is normally sufficient time to convert iron films of around 500 A. and alpha ferric oxide films of around 1000 A., and one and one half hours is sufficient time to completely convert iron films of around 4000 A. and alpha ferric oxide films of around 8000 A. It is to be noted, however, that time periods longer than necessary will not be harmful. It has been found that the conversion process can be optimized by insuring uniform heating of the material, and excluding any free oxygen from the substrate. Further, it has been found that the speed of the conversion process increases as the temperature of the substrate and film combination is increased from between 300° C. up to approximately 525° C., but that above 525° C. speed of the process remains generally constant. Therefore, a temperature of approximately 525° C. is especially desirable for practicing this invention even though temperatures much higher may be used if the substrate can withstand such higher temperatures.

In a second embodiment an iron film is deposited on a substrate in the same manner as described in the first embodiment. The iron film is then directly converted to a film of magnetite by heating said iron film and substrate combination in an oxidation-reduction atmosphere as heretofore described. The resulting magnetite film will be approximately 2 times the thickness of the deposited iron.

According to a third embodiment, a film of alpha ferric oxide is deposited directly on the desired substrate by such methods including but not limited to R.F. sputtering, reactive sputtering, vacuum vapor deposition and vacuum reactive evaporation. For most present recording and storage applications a 1000 A. to 8000 A. thickness is preferable. The alpha ferric oxide is then converted to a film of magnetite in precisely the same manner as was described in the first embodiment.

According to a fourth embodiment, a film of alpha ferric oxide is formed on the desired substrate or support member by heating said substrate to a temperature between a minimum temperature of 250° C. and a maximum temperature determined by the physical limitations of the substrate, or the vaporizing temperature of alpha ferric oxide, whichever is lower. However, a temperature of about 550° C.–700° C. is preferable for maximum efficiency. A surface of said heated substrate is then sprayed with a solution made from soluble iron salts dissolved in a suitable organic solvent. The heat of said substrate causes a reaction of said solution such that an adherent coating or film of alpha ferric oxide is deposited on said heated substrate. Soluble iron salts especially suitable for this invention are ferric acetylacetonate and ferric hexafluoroacetylacetonate, and the suitable organic solvents include but are not limited to benzene, benzene-methanol mixtures, and chlorinated hydrocarbons such as methylene chloride. The solution made from these compounds should be in the ratio of 0.1 gram to 0.5 gram of iron salt to each cubic centimeter of solvent. The film may be deposited to any desired thickness depending upon the future use of the magnetic storage device, although for most present applications 1000 A. to 8000 A. is preferable. The alpha ferric oxide is then converted to a film of magnetite in precisely the same manner as was described in the first embodiment.

The magnetite film produced by any of the above embodiments can be converted, if desired, to magnetic gamma ferric oxide. To convert the magnetite film to a gamma ferric oxide film, the substrate or supporting member and magnetite film are heated to a temperature of between 200° C. and 350° C. in a highly oxidizing atmosphere such as air, for a period of about 1–10 hours. The lower the temperature used, the longer the time period that will be required. Tests have shown, that excellent results are obtained if the substrate and film combination is heated to 275° C. in air for approximately 3 hours.

It may be desirable at this point to again call attention to the fact that magnetic recording and storage devices made or manufactured as set forth herein do not require the use of a binding material for binding magnetic particles together or for binding the particles to the substrate as was required by the prior art. Further, the magnetic film or coatings of devices produced by the practice of this invention have excellent adherence, substantially uniform thickness, high magnetic flux density, and can be applied in such thin films that the smoothness of the combination film and substrate is effectively the smoothness of the substrate. Therefore, since suitable materials, especially materials such as aluminum, glass, glass-ceramics or ceramics can be formed with, or be readily ground and polished to extremely smooth surfaces for depositing magnetic recording or storage films thereon, the resulting film and substrate combination is exceptionally smooth. Furthermore, these materials in various combinations may be readily formed into disk, drum, rod or tape substrates.

Five specific examples of embodiments of the method of this invention for producing magnetic recording and storage devices follow.

EXAMPLE I

A 1900 A. film of iron is deposited by the R.F. sputtering process on an ion exchange strengthened glass disk substrate having a thickness of 0.08 inch, an outside diameter of 14 inches, and a 6⅝ inch diameter center hole. This film of iron is then converted into an approximately 3900 A.–4000 A. film of alpha ferric oxide by heating and maintaining the substrate and said iron film at a temperature of approximately 450° C. for about 1½ hours in air. The alpha ferric oxide film is then converted to magnetite by subjecting said film to an oxidation-reduction atmosphere of $H_2$ and $H_2O$ in combination with inert $N_2$ while simultaneously maintaining said substrate and alpha ferric oxide film at a temperature of about 525° C. for approximately 1 hour. The $H_2$, $H_2O$ and $N_2$ atmosphere, having hydrogen partial pressure to water partial pressure ratio of about 2.4:1, is obtained by bubbling a mixture of 8% hydrogen by volume and 92% nitrogen by volume through water, while said hydrogen, nitrogen and water is maintained at approximately 25° C. A device produced by the method outlined in this example will result in a magnetic recording and storage disk with approximately a 3900 A.–4000 A. thick film of magnetite.

EXAMPLE II

A 1900 A. film of iron is vacuum vapor deposited on a strengthened glass substrate such as described in Example I. This iron film is converted to approximately a 3900 A.–4000 A. film of magnetite by the same process as was described in Example I for converting alpha ferric oxide to magnetite.

EXAMPLE III

A 4000 A. film of alpha ferric oxide is deposited on a strengthened glass substrate such as described in Example I by the reactive sputtering process. Said film of alpha ferric oxide is then converted to magnetite by subjecting said film to a CO and $CO_2$ oxidation-reduction atmosphere while simultaneously maintaining said substrate and alpha ferric oxide film at a temperature of about 525° C. for approximately 1 hour. Said CO and $CO_2$ atmosphere has a carbon monoxide partial pressure to carbon dioxide partial pressure ratio of about $10^{-2}:1$ which can readily be determined by simple instrumentation such as a flowmeter.

EXAMPLE IV

A film of alpha ferric oxide is deposited on a strengthened glass substrate, such as described in Example I, by heating the substrate to a temperature of approximately 550° C. and then spraying said heated substrate with a solution of ferric acetylacetonate iron salts dissolved in an organic solvent of benzene-methanol. The ratio of the iron salt to solvent is 0.2 gram salt per cubic centimeter of solvent. The benzene-methanol solvent mixture has a ratio of 80% benzene with 20% methanol by volume. Said solution will decompose as it contacts the heated substrate, thereby leaving a film or coating of alpha ferric oxide on the substrate. The alpha ferric oxide is deposited to a thickness of approximately 4000 A. and is then converted to magnetite in precisely the same manner as described in Example I.

EXAMPLE V

A magnetic recording and storage device having a film of gamma ferric oxide as the recording and storage medium is formed by converting the magnetite film of a device formed by any one of the four previous examples. The magnetite film is converted to gamma ferric oxide by heating the film and substrate combination to a temperature of approximately 275° C. in air for approximately 3 hours. This conversion process results in a magnetic recording and storage disk with an approximately 3900 A.–4000 A. thick film of gamma ferric oxide.

Although the present invention has been described with respect to specific examples and specific methods of production, it is not intended that such specific references be limitations upon the scope of the invention except insofar as is set forth in the following claims.

We claim:

1. A method of making a magnetic recording and storage device comprising the steps of
   providing an inorganic non-magnetic support member,
   depositing directly on a surface of said support member a continuous film of an iron containing material selected from the group consisting of elemental iron, and alpha ferric oxide,
   heating said support member and film of iron containing material to a temperature of at least 300° C. in an oxidation-reduction atmosphere to convert said film to a film of magnetite, and
   maintaining said support member and magnetite film at a temperature of between 200° C. and 350° C. in an oxidizing atmosphere for a period of between 1–10 hours, whereby said film of magnetite is converted to a film of gamma ferric oxide.

2. The method of claim 1 wherein said film of iron containing material is iron having a thickness of between about 500 A. and 4000 A.

3. The method of claim 2 wherein said support member is formed of material selected from the group consisting of aluminum, glass, glass-ceramic and ceramic, and said atmosphere is selected from the group consisting of hydrogen and water, carbon monoxide and carbon dioxide, and carbon monoxide and water.

4. The method of claim 1 wherein said film is alpha ferric oxide and said alpha ferric oxide film is between 1000 A. and 8000 A. in thickness.

5. The method of claim 4 wherein said support member is formed of material selected from the group consisting of aluminum, glass, glass-ceramic and ceramic, and said atmosphere is selected from the group consisting of hydrogen and water, carbon monoxide and carbon dioxide, and carbon monoxide and water.

6. The method of claim 1 wherein said depositing step comprises depositing a film of iron by R.F. sputtering.

7. The method of claim 1 wherein said depositing step comprises depositing a film of iron by D.C. sputtering.

8. The method of claim 1 wherein said depositing step comprises depositing a film of alpha ferric oxide by R.F. sputtering.

9. The method of claim 1 wherein said depositing step comprises
   depositing a film of iron on said support member, and
   converting said iron film to alpha ferric oxide by heating said iron film and support member combination to at least 300° C. in an oxidizing atmosphere.

10. The method of claim 1 wherein said depositing step comprises depositing a film of iron by vacuum vaporization.

11. The method of claim 1 wherein said depositing step comprises depositing a film of alpha ferric oxide by vacuum vaporization.

12. The method of claim 1 wherein said depositing step comprises depositing a film of alpha ferric oxide by vacuum reactive evaporation.

13. The method of claim 1 wherein said depositing step comprises
   heating support member to a temperature of at least 250° C., and
   spraying said heated support member with an iron compound solution consisting of an iron salt dissolved in a suitable organic solvent, whereby a film of alpha ferric oxide is deposited on said support member.

14. A method of making a magnetic recording and storage device comprising the steps of
   providing a disk shaped non-magnetic support member, said disk being formed from an ion exchange strengthened material selected from the group consisting of glass and glass-ceramic,
   depositing by sputtering a film of alpha ferric oxide having a thickness of about 4000 A. onto said disk, and
   converting said sputtered film to a film of magnetite by subjecting said disk and said sputtered film combination to an atmosphere of carbon monoxide and carbon dioxide for approximately one hour while said combination is maintained at approximately 525° C., said reducing atmosphere having a carbon monoxide partial pressure to carbon dioxide partial pressure ratio of between 1:1 and $10^{-5}$:1.

15. The method of claim 14 further comprising the step of maintaining said disk and magnetite film to a temperature of approximately 275° C. in air for a period of approximately 3 hours, whereby said film of magnetite is converted to a film of gamma ferric oxide.

16. A method of making a magnetic recording and storage device comprising the steps of
   providing a disk shaped non-magnetic support member, said support member being formed from an ion exchange strengthened material selected from the group consisting of glass and glass-ceramic,
   depositing by R.F. sputtering a film of iron having a thickness of about 1900 A. on said support member,
   heating said substrate and iron film to a temperature of about 450° C. in air for approximately one and one half hours, to convert said iron film to a film of alpha ferric oxide, and
   reducing said alpha ferric oxide film to a film of magnetite by subjecting said support member and deposited film combination to an atmosphere of carbon monoxide and carbon dioxide for approximately one hour while said combination is maintained at approximately 525° C., said atmosphere having a carbon monoxide partial pressure to carbon dioxide partial pressure ratio of between 1:1 and $10^{-5}$:1.

17. The method of claim 16 further comprising the steps of maintaining said support member and magnetite film to a temperature of approximately 275° C. in air for a period of approximately 3 hours, whereby said film of magnetite is converted to a film of gamma ferric oxide.

References Cited

UNITED STATES PATENTS

| | | | |
|---|---|---|---|
| 3,620,841 | 11/1971 | Comstock et al. | 117—237 |
| 2,978,414 | 4/1961 | Harz et al. | 252—62.5 |
| 3,681,226 | 7/1970 | Vogel | 204—192 |
| 3,681,227 | 8/1972 | Szupillo | 204—192 |

GERALD L. KAPLAN, Primary Examiner

W. A. LANGEL, Assistant Examiner

U.S. Cl. X.R.

117—49, 54, 107; 148—6.35; 204—192; 252—62.56; 423—634